US008855499B2

(12) United States Patent
Sokolov et al.

(10) Patent No.: US 8,855,499 B2
(45) Date of Patent: Oct. 7, 2014

(54) POWER RECAPTURE IN AN OPTICAL COMMUNICATIONS SYSTEM

(75) Inventors: Vladimir Sokolov, Rochester, MN (US); James N. Kruchowski, Rochester, MN (US); Mark A. Nelson, Oronoco, MN (US); Nathan E. Harff, Rochester, MN (US)

(73) Assignee: Mayo Foundation for Medical Education and Research, Rochester, MI (US)

( * ) Notice: Subject to any disclaimer, the term of this patent is extended or adjusted under 35 U.S.C. 154(b) by 90 days.

(21) Appl. No.: 13/522,520

(22) PCT Filed: Jan. 21, 2011

(86) PCT No.: PCT/US2011/022030
§ 371 (c)(1),
(2), (4) Date: Sep. 18, 2012

(87) PCT Pub. No.: WO2011/091234
PCT Pub. Date: Jul. 28, 2011

(65) Prior Publication Data
US 2013/0202292 A1 Aug. 8, 2013

Related U.S. Application Data

(60) Provisional application No. 61/297,025, filed on Jan. 21, 2010.

(51) Int. Cl.
*H04B 10/80* (2013.01)
*H04J 14/02* (2006.01)
(52) U.S. Cl.
CPC .............. *H04J 14/02* (2013.01); *H04B 10/807* (2013.01)

USPC ........................................................ 398/171
(58) Field of Classification Search
USPC ........................................................ 398/171
See application file for complete search history.

(56) References Cited

U.S. PATENT DOCUMENTS

| 5,859,719 A | 1/1999 | Dentai et al. |
| 6,295,150 B1 | 9/2001 | Ohwada et al. |
| 7,359,647 B1 * | 4/2008 | Faria et al. ..................... 398/171 |

(Continued)

FOREIGN PATENT DOCUMENTS

WO  2009022799 A1  2/2009

OTHER PUBLICATIONS

Notification of Transmittal of the International Search Report and Written Opinion of the International Searching Authority, or Declaration for corresponding application No. PCT/US2011/022030, mailed May 11, 2011, 12 pages.

(Continued)

*Primary Examiner* — Leslie Pascal
(74) *Attorney, Agent, or Firm* — Shumaker & Sieffert, P.A.

(57) ABSTRACT

In an n-node optical communications system, energy harvesting photodetectors at each node receive extraneous electromagnetic wavelengths that are not used for communication or other purposes by the associated node. The energy harvesting photodetectors convert the unused electromagnetic energy into reusable electrical energy. The harvested electrical energy may be used as auxiliary power at the node or elsewhere in the communication system, or stored in a battery, capacitor, or other energy storage device. The system may be used in an "all-to-all" broadcast and select communication scheme or in some other broadcast and select interconnect system that has extraneous wavelengths at node receivers.

13 Claims, 4 Drawing Sheets

(56) References Cited

U.S. PATENT DOCUMENTS

| | | |
|---|---|---|
| 2004/0258423 A1 | 12/2004 | Winzer |
| 2008/0166133 A1* | 7/2008 | Hsiao ............................ 398/168 |
| 2009/0166509 A1 | 7/2009 | Kline |
| 2010/0061734 A1* | 3/2010 | Knapp ......................... 398/128 |

OTHER PUBLICATIONS

Notification Concerning Transmittal of International Preliminary Report on Patentability (Chapter I of the Patent Cooperation Treaty) for corresponding application No. PCT/US2011/022030, mailed Aug. 2, 2012, 7 pages.

Jalali et al., "Energy Harvesting in Silicon Photonic Devices", downloaded on Aug. 12, 2009 from IEEE Xplore, 2 pages.

Fathpour et al., "Two-Photon Photovoltaic Effect in Silicon", IEEE Journal of Quantum Electronics, vol. 43, No. 12, Dec. 2007, 7 pages.

Banwell et al., "Powering the Fiber Loop Optically—A Cost Analysis", Journal of Lightwave Technology, 11 No. 3, Mar. 1993, 16 pages.

Jalali et al., "Green Silicon Photonics", OPN, Jun. 2009, 6 pages.

\* cited by examiner

POWER RECAPTURE IN AN OPTICAL COMMUNICATIONS SYSTEM

CROSS REFERENCE TO RELATED APPLICATIONS

This application claims the benefit of U.S. Provisional Application No. 61/297,025, filed Jan. 21, 2010, which is incorporated herein by reference in its entirety.

TECHNICAL FIELD

The disclosure relates generally to optical communications. More specifically, the disclosure relates to reducing net power consumption in an optical communications network.

BACKGROUND

Typical optical communications systems employ a plurality of optical nodes that are adapted to transmit and receive optical signals over one or more communications links between the nodes, e.g. a fiber-optic cable, waveguide, or other optical communications link. Each node may include a transmitter such as a laser, and/or a receiver such as a photodiode or other light sensitive detector. Generally, the wavelengths associated with electromagnetic optical signals is understood to be from approximately 300 µm (corresponding frequency in free space of 1 THz) to 10 nm (corresponding frequency in free space of 30,000 THz).

Optical communications systems are advantageous in comparison with electrical or wireless communications systems in that they are capable of communicating information at very fast speeds. One problem with optical communications system is that operation of lasers and other system components may consume relatively large amounts of power.

SUMMARY

In one example, the disclosure is directed to a device, comprising a data transducer configured to detect energy of a first subset of a plurality of wavelengths of a received electromagnetic signal and an energy harvesting transducer configured to convert energy of a second subset of the plurality of wavelengths of the received electromagnetic signal into reusable electrical energy. The device may further include a demultiplexer module that receives energy of the plurality of wavelengths and directs energy of the first subset to the data transducer. The demultiplexer module may further direct energy of the second subset of the plurality of wavelengths to the energy harvesting transducer. The data transducer may further detect data from the first subset of the plurality of wavelengths and generate an electrical signal indicative of the data. The energy harvesting transducer may convert the energy of the second subset of the plurality of wavelengths into electrical energy.

In another example, the disclosure is directed to a method comprising receiving at least one electromagnetic signal that includes energy of a plurality of wavelengths, detecting, in energy of a first subset of the plurality of wavelengths, information communicated via the at least one electromagnetic signal and converting energy of a second subset of the plurality of wavelengths into reusable electrical energy.

In another example, the disclosure is directed to a system comprising a plurality of nodes; and a plurality of optical interconnects communicatively coupling each node to at least one other of the plurality of nodes, wherein at least some of the plurality of nodes comprise a data transducer configured to detect energy of a first subset of a plurality of wavelengths of a received electromagnetic signal and an energy harvesting transducer configured to convert energy of a second subset of the plurality of wavelengths of the received electromagnetic signal into reusable electrical energy.

In another example, the disclosure is directed to a wave division multiplexed (WDM) optical communications system, comprising a plurality of nodes, and an all-to-all optical interconnect system communicatively coupling each node to every other one of the plurality of nodes, wherein each of the plurality of nodes comprise a demultiplexer module that receives communication signals having a plurality of wavelengths communicated via the optical interconnect system and separates the communication signals into a data signal comprised of a subset of the plurality of wavelengths uniquely corresponding to the node and a second signal comprised of a remaining subset of the plurality of wavelengths, a data transducer configured to receive the data signal and generate an electrical signal indicative of the data, and an energy harvesting transducer configured to receive the second signal and convert energy of the remaining subset of the plurality of wavelengths into reuseable electrical energy.

The details of one or more examples are set forth in the accompanying drawings and the description below. Other features and advantages will be apparent from the description and drawings, and from the claims.

DETAILED DESCRIPTION

Figure 1:
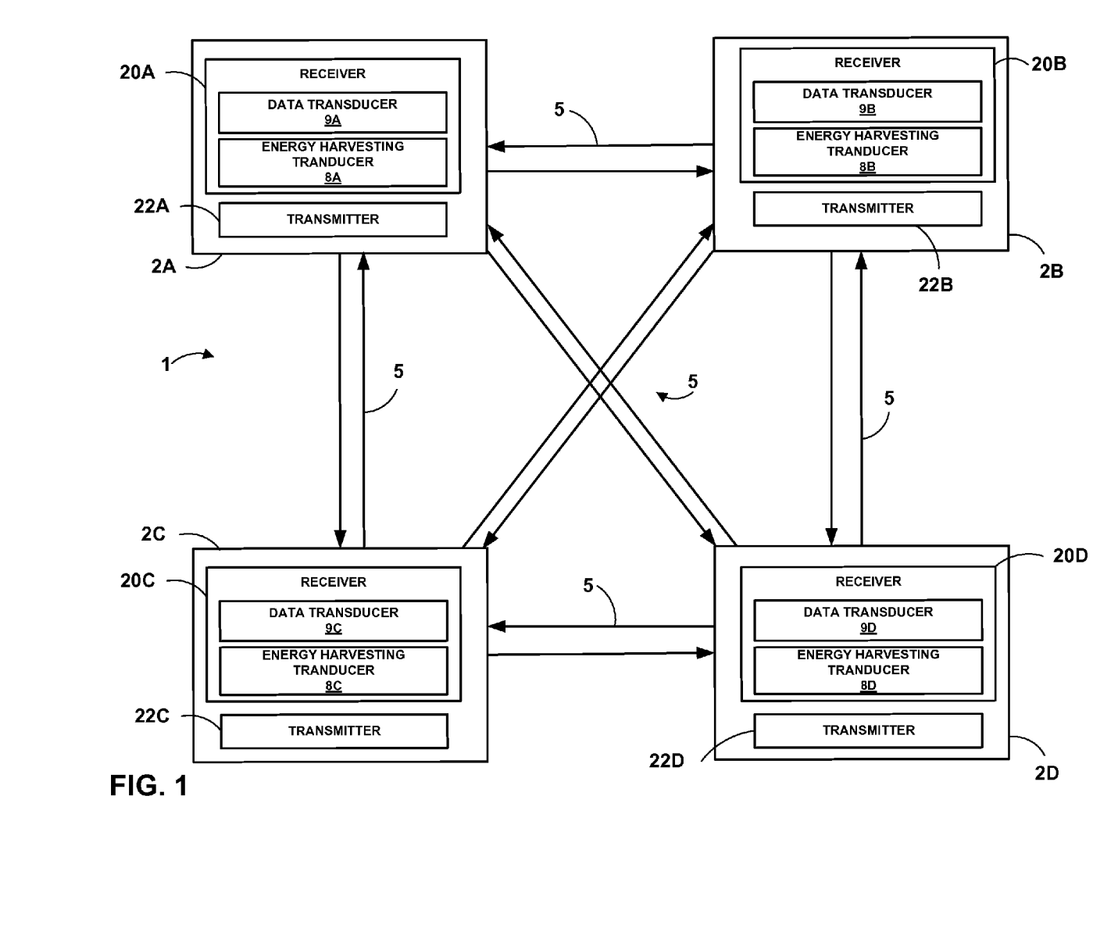
FIG. 1 is a block diagram illustrating one example of a communications system consistent with this disclosure.

FIG. 1 is a block diagram illustrating an example communications system 1. Communications system 1 may be an optical communications system. Generally, the wavelengths associated with electromagnetic optical signals is understood to be from approximately 300 µm (corresponding frequency in free space of 1 THz) to 10 nm (corresponding frequency in free space of 30,000 THz).

The example communications system 1 includes a plurality of communication nodes 2A-2D. System 1 of FIG. 1 shows four nodes 2A-2D for exemplary purposes, however as few as two or greater than four communication nodes are also contemplated by this disclosure.

Nodes 2A-2D of system 1 may be configured to communicate with one another using energy transmitted via communications links 5. The energy transmitted via communications links 5 may be electromagnetic energy of visible or near-visible light wavelengths of the electromagnetic spectrum, although energy of other wavelengths is also contemplated. In one example, communications links 5 are fiber-optic cables. Other examples of communication links 5 may include waveguides such as dielectric waveguides, opto-isolators, or the like. In some examples, system 1 may communicate over relatively large distances between nodes 2A-2D, such as in a telecommunications network. In other examples, system 1 may communicate over relatively short distances, e.g. between individual computer chips, or between nodes 2A-2D embedded in the same chip.

Each of nodes 2A-2D may include a transmitter 22A-22D and a receiver 20A-20D. Transmitters 22A-22D may communicate information via signals in the form of electromagnetic energy. In one example, transmitters 22A-22D may include one or more lasers, light emitting diodes (LED) or other electromagnetic energy-emitting components. Information may be communicated via one or more techniques for encoding information in electromagnetic signals, for example intensity, frequency, and/or phase-based optical modulation techniques. Transmitters 22A-22D of nodes 2A-2D may include one or more electromagnetic-energy emitting components that transmit energy of different wavelengths, for example multiple lasers that emit light of different wavelengths (for example light of different colors if the light is in the visible spectrum, or of different bands of wavelengths).

Nodes 2A-2D may further include receivers 20A-20D. Receivers 20A-20D may include one or more data transducer(s) 9A-9D operative to receive electromagnetic signal(s) and translate the signal(s) into one or more electrical signals for further processing, storage, communication, or the like. Various examples of transducers that translate an electromagnetic signal to an electrical signal include any combination of: optical photodetectors, photodiodes, photomultiplier tubes, phototubes, phototransistors, or other quantum devices in which an individual photon produces a discrete effect, photoresistors (also known as Light Dependent Resistors (LDR) which change resistance according to light intensity), photovoltaic cells (also known as solar cells) that produce a voltage and supply an electric current when illuminated, pyroelectric detectors (also known as Golay cells, thermocouples, and thermistors) that respond to a heating effect of incoming radiation, cryogenic detectors, charge coupled devices (CCD), and reverse-biased Light Emitting Diodes (LEDs). An electromagnetic signal received by any one of the receivers 20A-20D may include electromagnetic energy of a plurality of wavelengths, or bands of wavelengths.

Some example optical communications systems communicate according to a Wave Division Multiplexed (WDM) communications scheme. In some WDM systems, electromagnetic energy of a plurality of wavelengths may be transmitted to each node of a system, however a particular node (such as node 2A in FIG. 1) may be configured to detect and/or use energy of only a subset of wavelengths of system 1 received by the node.

For example, the system shown in FIG. 1 is an example of an "all-to-all" communication system in which each node 2A-2D is connected to every other node with no "loop back" (node communicating with itself) using dedicated optical communication links connecting each node to every other node. Each node may send a unique message to any other node in the system using a distinct, dedicated wavelength. For example, in an all-to-all system with n nodes, a total of n*(n–1) communication links, each using a different wavelength, are required if loop-backs are not used. In the example of FIG. 1, therefore, n=4 and thus 12 (4*3=12) communication links are required. Implementing the communication links with optical interconnects and using a "broadcast and select" WDM system with multiple wavelength-specific lasers at each node requires a total of 12 different wavelengths and a broadcast element (implied, but not shown in FIG. 1). Each node-transmitter transmits unique messages to its three neighbors using three unique wavelengths. However, all 12 wavelengths appear on each of the four output fibers of the broadcast element. The four output fibers are directed to the four optical receivers 20A-20D associated with each node 2A-2D, respectively. At each receiver a wavelength selective device (e.g., a demultiplexer such as an array waveguide grating (AWG)) separates out the three wavelengths being transmitted by its three neighbors. However, the remaining nine of the twelve wavelengths are not used by the node in this example.

As discussed above, one problem with optical communications systems is that system components, e.g. lasers or other electromagnetic energy emitting components, consume a relatively large amount of power. Because each of nodes 2A-2D is configured to detect and/or process energy of only a subset of wavelengths transmitted to the node, energy of wavelengths outside of that subset may be wasted. For example, the unused wavelengths are typically terminated to dissipate the energy with minimal reflection and the light energy is converted to wasted heat.

To reduce optical communication system power consumption, the techniques described herein generally concern recycling of energy of received electromagnetic signal(s) not used and/or detected for signal communication or other purposes.

As depicted in FIG. 1, each of receivers 20A-20D includes one or more respective energy harvesting transducer(s) 8A-8D. As will be discussed in further detail in examples presented below, energy harvesting transducers 8A-8D may be configured to capture energy of wavelength(s) unused by a particular optical communications node 2A-2D, and convert the captured energy into electrical energy. Energy harvesting transducers 8A-8D may be any of the examples of transducers listed above with respect to data transducers 9A-9D. In one example, energy harvesting transducers 8A-8D are optical power averaging photo-detectors. In some examples, converted energy may provide power to other components of system 1. For example, each node receiver may direct the optical power from $(n-1)^2$ wavelengths that are not used by the receiver to an energy harvesting photodetector to boost or augment the local node power supply. As another example, the energy from the unused wavelengths may be used to augment power for other nodes in the system. In other examples, captured power may be stored in an energy storage device, such as a battery.

More generally, if the system is not an "all-to-all" but some other broadcast and select interconnect system that has extraneous wavelengths at node receivers, then these too may be directed to an energy harvesting photodetector to generate auxiliary power. Although the energy harvesting is described with respect to an "all-to-all" broadcast and select interconnect system, it shall be understood that the disclosure is not limited in this respect.

Figure 2:
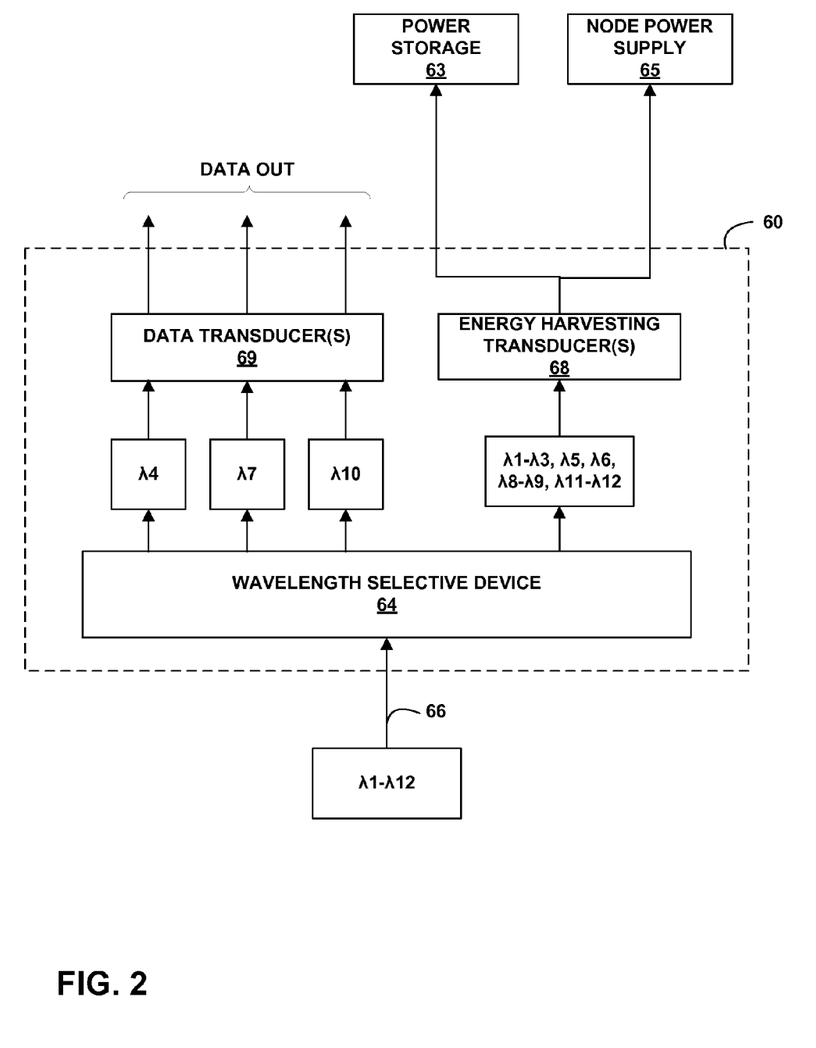
FIG. 2 is a block diagram illustrating a node of a communications system consistent with this disclosure.

FIG. 2 is a block diagram illustrating an example of a node receiver 60 of a communications system such as system 1 illustrated in FIG. 1. Receiver 60 may be configured to receive energy, e.g. electromagnetic energy in the form of light. Input 66 may be coupled to one or more communication links such as links 5 illustrated in FIG. 1 to receive communicated energy. The energy may include one or more indications of information, such as modulated data.

Receiver 60 may include one or more data transducer(s) 69 and one or more energy harvesting transducer(s) 68. Data transducer(s) 69 may be configured to receive energy of one or more wavelengths or wavelength bands that are a subset of wavelengths of electromagnetic energy received at input 66. Data transducer(s) 69 may convert received electromagnetic energy into another form, e.g. electrical energy. For example, data transducer(s) 69 may receive an electromagnetic signal that includes information, and translate the electromagnetic signal into one or more electrical signals indicative of the information communicated in the signal. Receiver module 60 may further include one or more additional modules (not shown), such as electrical circuitry, coupled to data transducer 69. The one or more additional modules may receive electrical signals from data transducer 69 and process, store, communicate, or otherwise utilize the electrical signals.

As depicted in FIG. 2, receiver 60 receives an input 66 including an electromagnetic signal that includes a plurality of wavelengths, or wavelength bands, of electromagnetic energy. In the depicted example, the electromagnetic energy received is near infrared light, but other wavelengths in the optical range are also possible. The received visible light includes portions of a plurality of wavelengths (or wavelength bands), in this case wavelengths $\lambda 1$-$\lambda 12$ (or wavelength bands). Data transducer 69 may be configured to detect, process, or otherwise use only energy of a subset of wavelengths or wavelength bands of the light received at input 66; in the example of FIG. 2 $\lambda 4$, $\lambda 7$, and $\lambda 10$ corresponding to the information received from the other three nodes of the 4-node system of FIG. 1. Because only three of the twelve wavelengths are useful to data transducer(s) 69, in a typical optical communications signal energy of the other nine wavelengths may be dissipated as heat or otherwise wasted.

Each receiver 60 includes a wavelength selective device 64, (e.g., a demultiplexer, such as an array waveguide grating (AWG) or other wavelength selective device), that separates out the wavelengths (in this case $\lambda 4$, $\lambda 7$, and $\lambda 10$) transmitted to the local node from the other nodes in the system. That is, device 64 separates the received signal into a first signal including the wavelengths containing information uniquely directed to that node and a second signal comprised of the remaining wavelengths. The remaining wavelengths (in this example, $\lambda 1$-$\lambda 3$, $\lambda 5$, $\lambda 6$, $\lambda 8$, $\lambda 9$ and $\lambda 11$-$\lambda 12$) energy in the unused wavelengths may be received by one or more energy harvesting transducer(s) 68. Energy harvesting transducer(s) 68 may be a power transducer operable to convert received electromagnetic energy into electrical or other forms of useable power. For example, energy harvesting transducer 68 may be implemented using an energy harvesting photodetector that generates an average direct current through the photovoltaic effect that can be applied to generate voltage and power. This harvested voltage/power may be used to augment the local node power supply 65, to augment power in other parts of the interconnect system, and/or be stored in a battery, capacitor, or other energy storage device 63. In some examples, an interface circuit that regulates/conditions the photo-detected energy from energy harvesting transducer 68 may also be present between energy harvesting transducer and the energy storage device.

In some examples, electromagnetic energy converted to electrical energy (power) by energy harvesting transducer 68 may be utilized to power components of receiver 60 and/or transmitter 22. For example, power captured by energy harvesting transducer 68 may be utilized to power one or more electromagnetic energy-emitting components of transmitter 22.

Figure 3:
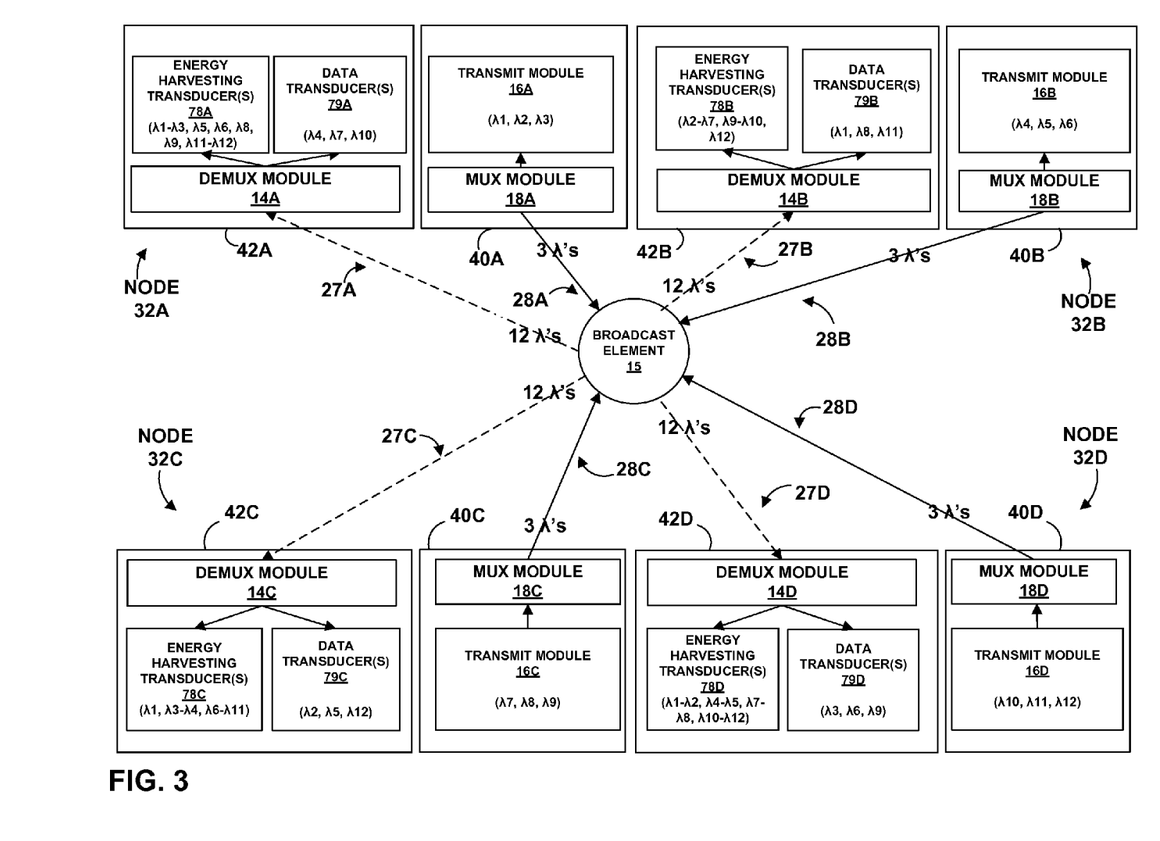
FIG. 3 is a block diagram illustrating one example of a communications system consistent with this disclosure.

FIG. 3 illustrates one example of a four node communications network consistent with this disclosure. The four node communications network of FIG. 3 includes nodes 32A-32D. Nodes 32A-32D are coupled to one another via transmit communications links 28A-28D (solid arrows in FIG. 3) and receive communications links 27A-27D (dashed arrows in FIG. 3) via broadcast element 15 as discussed in further detail below. As shown in FIG. 3, each of nodes 32A-32D includes a transmitter 40A-40D, and each transmitter 40A-40D may include a transmit module 16A-16D. Each of transmit modules 16A-16D may include multiple wavelength-specific lasers or tunable lasers at each node configured to transmit energy of a subset of the total number of wavelengths utilized by the system. For example, transmit module 16A of node 32A may include one or more wavelength-specific lasers configured to transmit electromagnetic signals of wavelengths $\lambda 1$, $\lambda 2$, and $\lambda 3$. Similarly, transmit module 16B of node 32B may include one or more wavelength-specific lasers configured to transmit electromagnetic signals of wavelengths $\lambda 4$, $\lambda 5$, and $\lambda 6$, transmit module 16C of node 32C may include one or more wavelength-specific lasers configured to transmit electromagnetic signals of wavelengths $\lambda 7$, $\lambda 8$, and $\lambda 9$, and transmit module 16D of node 32D may include one or more wavelength-specific lasers configured to transmit electromagnetic signals of wavelengths $\lambda 10$, $\lambda 11$, and $\lambda 12$. As such, each node 32A-32B of the system is adapted to transmit energy of a respective subset of signals used by the system. Respective wavelengths $\lambda 1$-$\lambda 12$ as discussed herein may refer to a single wavelength of electromagnetic energy, or a range or band of wavelengths of electromagnetic energy.

Transmitters 42A-42D of nodes 32A-32D may each further include multiplexer modules 18A-D. Multiplexer, or mux, modules 18A-18D may combine signals (e.g. $\lambda 1$, $\lambda 2$, and $\lambda 3$ for node 32A) for transmission. In one example, mux modules 18A-18D may include one or more array waveguide grating (AWG), filters, diffraction grating, fiber Bragg grating (FBG), micro-ring resonators, interference thin-film filters (TFF), or other like components capable of combining electromagnetic signals.

According to the example of FIG. 3, each of transmitters 40A-40D is coupled to a common broadcast element 15 via respective transmit communications links 28A-28D. Broadcast element 15 may receive electromagnetic signals from each of transmitters 40A-40D, and combine received signals into a combined electromagnetic signal that includes energy of all the wavelengths used by a particular system to communicate, for example, an electromagnetic signal that includes energy of all twelve wavelengths used by the system of FIG. 3 ($\lambda 1$-$\lambda 12$).

Broadcast element 15 may communicate, via respective receive communication links 27A-27D to respective nodes 32A-32D, a combined electromagnetic signal. As shown in FIG. 3, each respective receiver 42A-42D may be configured to detect and/or use a subset of wavelengths of a received electromagnetic signal. For example, receiver 42A of node 32A may receive, via receive communications link 27A coupled to broadcast element 15, an electromagnetic signal that includes twelve wavelengths (or wavelength ranges) as discussed above. However, receiver 42A may be configured to detect and/or use energy of a subset of wavelengths of a received electromagnetic signal, such as to detect information communicated via the received electromagnetic signal. In the example depicted in FIG. 3, receiver 42A is configured to detect and/or use only energy of wavelengths $\lambda 4$, $\lambda 7$, and $\lambda 10$. Similarly, receiver 42B is configured to detect and/or use only energy of wavelengths $\lambda 1$, $\lambda 8$, and $\lambda 11$, receiver 42C is configured to detect and/or use only energy of wavelengths $\lambda 2$, $\lambda 5$, and $\lambda 12$, and receiver 42D is configured to detect and/or use only energy of wavelengths $\lambda 3$, $\lambda 6$, and $\lambda 9$.

In this example, each receiver 42A-42D is configured to detect and/or use energy of a subset of the twelve wavelengths received. Thus, for each receiver 42A-42D, energy of nine wavelengths, or seventy-five percent of the energy of a received signal in this example, is directed to one or more energy harvesting transducers 78A-78D, respectively.

Receivers 42A-42D of FIG. 3 each employ at least one energy harvesting transducer 78A-78D. The at least one energy harvesting transducer 78A-78D is configured to convert received electromagnetic energy into reuseable electrical energy. Energy harvesting transducers 78A-78D may be configured to capture electromagnetic energy of wavelengths not detected and/or used by data transducers 79A-79D. For example, since node 32A is configured to detect and/or use energy of wavelengths λ4, λ7, and λ10, energy harvesting transducer 78A may convert energy of wavelengths λ1-λ3, λ5, λ6, λ8, λ9, and λ11-λ12. Similarly, respective energy harvesting transducers 78B-78D may each convert energy of unused and/or undetected wavelengths of nodes 32B-32D, respectively.

As shown in FIG. 3, each of respective nodes 32A-32D may further include a wavelength selective device or demultiplexer (demux) module 14A-14D. Each of demux modules 14A-14D may operate to separate energy of different wavelengths of an electromagnetic signal received by respective nodes 32A-32D. In this example, device 14 may separate the received signal into a first signal including the wavelengths uniquely associated with the node and a second signal comprised of the remaining wavelengths. In one example, demux modules 14A-14D may direct the first signal (that portion of the signal detected and/or used by the respective node 32A-32D) to that node's data transducer 79A-79D. In another example, each demux module 14A-14D may instead or in addition direct the second signal (energy of wavelengths not detected and/or used by the respective node 32A-32D) to that node's energy harvesting transducer 78A-78D. In one example, demux modules 14A-14D include one or more array waveguide gratings (AWG). Other examples of optical components operable to direct wavelength specific energy include Echelle grating, optical comb filter, TFF, etc. In addition, it should be noted that many of the muxing components are reciprocal so they may also function as a demuxing component.

Receivers 42A-42D and transmitters 40A-40D may include components or modules not illustrated in FIG. 3. For example, receivers 42A-42D may include one or more electrical circuits operable to receive electrical signals from data transducers 79A-79D and process, store, or communicate the electrical signals. Receivers 42A-42D may also include one or more amplifiers, such as transimpedance amplifiers, that amplify the signal(s) from data transducers 79A-79D. Transmitters 40A-40D may include one or more electrical circuits configured to, for example, prepare a signal for transmission by transmit modules 40A-40D.

Figure 4:
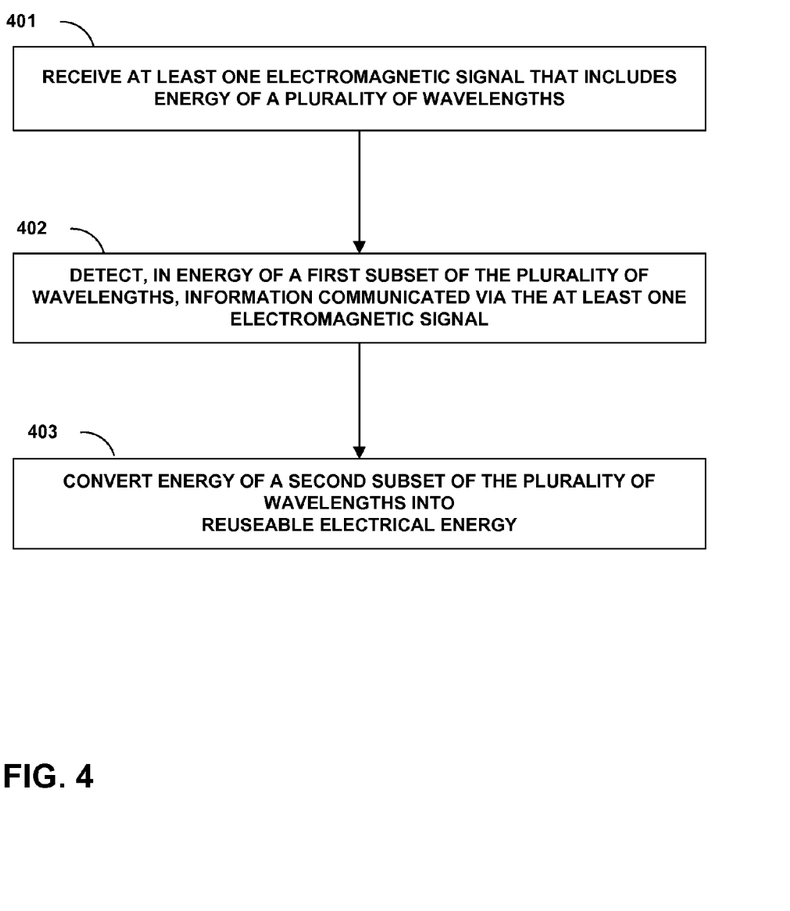
FIG. 4 is a flowchart illustrating one example of a method consistent with this disclosure.

FIG. 4 is a flow chart that illustrates one example of a process by which unused electromagnetic energy may be converted to reusable electrical energy. As shown in FIG. 4, an electromagnetic signal that includes energy of a plurality of wavelengths is received (401). Information communicated via energy of a first subset of the plurality of wavelengths of the at least one electromagnetic signal may be detected (402). The information may be detected by at least one data transducer such as transducer 69 of FIG. 2. Energy of a second subset of the plurality of wavelengths may be converted into reuseable electrical energy (403). The second subset of the plurality of wavelengths may be different than the first subset of the plurality of wavelengths. The energy of the second subset of the plurality of wavelengths may be converted by an energy harvesting transducer such as transducer 68 of FIG. 2. In one example, the harvested electrical energy is used to power one or more electronic devices. In one such example, the reusable electrical energy is used to power one or more circuits coupled to the data transducer or the energy harvesting transducer.

Various examples of communications systems are depicted in FIGS. 1-3. The examples of FIGS. 1 and 3, for example, show all-to-all broadcast and select communications systems that include a total of four nodes. Those of skill in the art will recognize that communications systems that include more or fewer nodes are contemplated. Further, the example system of FIG. 3 shows a four node communications system configured to communicate using an "all-to-all" interconnect system. Generally, if the system is not an "all-to-all" but some other broadcast and select interconnect system that has extraneous wavelengths at one or more node receivers, then these too may be directed to an energy harvesting photodetector to generate auxiliary power. Although the energy harvesting is described with respect to an "all-to-all" broadcast and select interconnect system, it shall be understood that the disclosure is not limited in this respect. In addition, systems utilizing more or fewer designated wavelengths (or wavelength ranges) for communication between nodes area also contemplated.

In addition, various components of communications systems are depicted in FIGS. 1-3, for example transmitters 40A-40D, transmitter modules 16A-16D, receivers 42A-42D, data transducers 79A-79D, energy harvesting transducers 78A-78D, broadcast element 15, mux modules 18A-18D, and demux modules 14A-14D of FIG. 3. These components are provided for exemplary purposes only, and one of skill in the art will recognize that the inclusion of additional or fewer communications components is within the scope of this disclosure. For example, the communications systems depicted in FIGS. 1-3 are generally directed to optical communication systems, e.g. fiber-optic communications systems that communicate via electromagnetic energy of visible or near-visible wavelengths. One of skill in the art will recognize that wavelengths other than those in the near infrared are possible for communications systems and are contemplated and within the scope of this disclosure.

Various examples have been described. These and other examples are within the scope of the following claims.

The invention claimed is:

1. A device comprising:
    a plurality of nodes that communicate via multiplexed electromagnetic signals comprised of a plurality of wavelengths, each of the plurality of wavelengths uniquely assigned to communicate data to a different one of the plurality of nodes;
    an all-to-all optical interconnect system communicatively coupling each node to every other one of the plurality of nodes;
    a plurality of data transducers, each uniquely associated with a different one of the plurality of nodes, and each configured to detect energy of the wavelength uniquely assigned to communicate data to the associated node and to generate a corresponding electrical signal indicative of the data communicated to the associated node; and
    a plurality of energy harvesting transducers, each uniquely associated with a different one of the plurality of nodes, and each configured to convert energy of the plurality of wavelengths other than the wavelength uniquely assigned to communicate data to the associated node into an electrical power signal.

2. The device of claim 1 further comprising a plurality of demultiplexer modules, each uniquely associated with a different one of the plurality of nodes, that receives the multiplexed electromagnetic signals and directs energy of the wavelength uniquely assigned to communicate data to the associated node to the data transducer.

3. The device of claim 2 wherein each of the plurality of demultiplexer modules further directs energy of the plurality of wavelengths other than the wavelength uniquely assigned to communicate data to the associated node to the energy harvesting transducer.

4. The device of claim 1 wherein the plurality of wavelengths are optical wavelengths.

5. The device of claim 4 wherein the optical wavelengths are in the range from approximately 300 microns to 10 nanometers.

6. The device of claim 1 wherein the energy harvesting transducer is an optical power averaging photo-detector.

7. The system of claim 1 further including an energy storage device connected to receive and store energy associated with the electrical power signal.

8. The system of claim 7 wherein the energy storage device comprises at least one of a battery or a capacitor.

9. A wave division multiplexed (WDM) optical communications system, comprising:
- a plurality of nodes that communicate via multiplexed optical communication signals comprised of a plurality of wavelengths; and
- an all-to-all optical interconnect system communicatively coupling each node to every other one of the plurality of nodes, wherein each of the plurality of nodes comprise:
- a demultiplexer module that receives the optical communication signals communicated via the all-to-all optical interconnect system and separates the communication signals into a data signal comprised of a first subset of the plurality of wavelengths uniquely associated with the node and a second signal comprised of a second, different subset of the plurality of wavelengths, the second subset of the plurality of wavelengths including wavelengths other than those in the first subset of the plurality of wavelengths and including at least one wavelength uniquely associated with at least one of the other of the plurality of nodes;
- a data transducer configured to receive the data signal and generate an electrical signal indicative of the information communicated by the data signal; and
- an energy harvesting transducer configured to receive the second signal and convert energy of the second, different subset of the plurality of wavelengths into reuseable electrical energy.

10. The system of claim 9 wherein the optical wavelengths are in the range from approximately 300 microns to 10 nanometers.

11. The system of claim 9 wherein the energy harvesting transducer is an optical power averaging photo-detector.

12. The system of claim 9 further including an energy storage device connected to receive and store the reusable electrical energy.

13. The system of claim 12 wherein the energy storage device comprises at least one of a battery or a capacitor.

* * * * *